United States Patent

Schneider et al.

[11] Patent Number: 5,997,618
[45] Date of Patent: Dec. 7, 1999

[54] FILTER AND METHOD FOR MAKING A FILTER

[75] Inventors: Kirk A. Schneider, Eden Prairie; Henry J. Drasner, III, Edina; Allan L. Liebrenz, Excelsior; Katsushi Isogawa, Rosemount; Stanley Bucknam Miller, III, Eden Prairie; Paul Lawrence Kojetin, Rosemount; Cynthia D. Bellefeuille, Eden Prairie; Andrew J. Dallas, Apple Valley; Suzan K. Nunnink, Delano, all of Minn.

[73] Assignee: Donaldson Company, Inc., Minneapolis, Minn.

[21] Appl. No.: 08/936,382

[22] Filed: Sep. 25, 1997

Related U.S. Application Data

[63] Continuation of application No. 08/492,725, Jun. 20, 1995, abandoned.

[51] Int. Cl.$^6$ .............................. B01D 53/04; B01D 46/10
[52] U.S. Cl. .................. 96/135; 96/147; 96/153; 96/154; 55/385.6; 55/486; 55/DIG. 5
[58] Field of Search ................. 55/385.1, 385.4, 55/385.6, 486, 512, 516, DIG. 5; 95/132, 136, 901; 96/4–14, 108, 134, 135, 138, 143, 147, 151, 153, 154; 423/230, 232

[56] References Cited

U.S. PATENT DOCUMENTS

| | | | |
|---|---|---|---|
| D. 281,163 | 10/1985 | Robinson | D14/109 |
| 3,006,346 | 10/1961 | Golding | 131/10 |
| 3,015,367 | 1/1962 | Smith et al. | 96/135 |
| 3,090,490 | 5/1963 | Yocum | 96/134 X |
| 3,413,982 | 12/1968 | Sublett et al. | 131/266 |
| 3,474,600 | 10/1969 | Tobias | 55/524 |
| 3,544,507 | 12/1970 | Lloyd . | |
| 3,611,678 | 10/1971 | Holden | 502/402 |
| 3,619,130 | 11/1971 | Ventriglio et al. | 423/230 |
| 3,622,446 | 11/1971 | Burnham | 162/146 |
| 3,630,007 | 12/1971 | Neumann | 96/129 |
| 3,721,072 | 3/1973 | Clapham | 55/514 X |
| 3,783,085 | 1/1974 | Pearson et al. | 161/87 |
| 3,911,080 | 10/1975 | Mehl et al. | 96/134 X |
| 3,971,373 | 7/1976 | Braun | 128/146.2 |
| 4,160,059 | 7/1979 | Samejima | 428/288 |
| 4,234,326 | 11/1980 | Bailey et al. | 55/521 X |

(List continued on next page.)

FOREIGN PATENT DOCUMENTS

| | | |
|---|---|---|
| 0 090 073 | 10/1983 | European Pat. Off. . |
| 0 702 994 A1 | 3/1996 | European Pat. Off. . |
| 54-058275 | 5/1979 | Japan .................... 96/134 |
| 54-162278 | 12/1979 | Japan .................... 96/134 |
| 56-013018 | 2/1981 | Japan .................... 96/154 |
| 60-008633 | 1/1985 | Japan .................... 96/135 |
| 60-161714 | 8/1985 | Japan .................... 96/134 |
| 62-26899 | 2/1987 | Japan .................... 96/108 |
| WO 85/02351 | 6/1985 | WIPO . |
| WO 91/14496 | 10/1991 | WIPO . |

OTHER PUBLICATIONS

Patent Abstracts of Japan, vol. 009, No. 331, Dec. 25, 1985 & JP,A, 06 161712 (Hitachi seisakusho KK), Aug. 25, 1985.
Patent Abstracts of Japan, vol. 95, No. 005, Sep. 29, 1995 & JP,A,07 136435 (Mitsubishi Materials Corp), May 30, 1995.

*Primary Examiner*—Robert Spitzer
*Attorney, Agent, or Firm*—Merchant & Gould P.C.

[57] ABSTRACT

A filter is provided which includes an organic vapor adsorbing layer, a first particulate removal layer, and a second particulate removal layer. The organic vapor adsorbing layer includes porous adsorbent beads which allow air or gas to flow therethrough with little resistance and provide increased surface area by virtue of the pores. The particulate removal layer can be made from an electrostatic and/or polytetraflouroethylene. The filter can have a figure of merit greater than about 10 and a capacity for permanently adsorbing organic vapors, wherein the figure of merit is calculated based upon a fractional efficiency determined for particles having a size of 0.3 $\mu$m in an air flow having a velocity of 10.5 ft./min and for Frazier permeability at 0.5 inches $H_2O$.

21 Claims, 3 Drawing Sheets

U.S. PATENT DOCUMENTS

| | | | |
|---|---|---|---|
| 4,272,264 | 6/1981 | Cullen et al. | 96/147 |
| 4,296,166 | 10/1981 | Ogino | 428/283 |
| 4,324,574 | 4/1982 | Fagan | 55/524 X |
| 4,342,811 | 8/1982 | Lopatin et al. | 428/220 |
| 4,397,907 | 8/1983 | Rossner et al. | 428/240 |
| 4,431,542 | 2/1984 | Dingfors et al. | 210/502.1 |
| 4,433,024 | 2/1984 | Eian | 428/198 |
| 4,455,187 | 6/1984 | von Blücher et al. | 156/277 |
| 4,504,290 | 3/1985 | Pontius | 55/486 X |
| 4,540,625 | 9/1985 | Sherwood | 428/283 |
| 4,556,547 | 12/1985 | Nishino et al. | 423/232 X |
| 4,600,420 | 7/1986 | Wydeven et al. | 55/501 |
| 4,614,528 | 9/1986 | Lennen | 96/147 |
| 4,617,122 | 10/1986 | Kruse et al. | 210/493.3 |
| 4,650,506 | 3/1987 | Barris et al. | 55/487 |
| 4,657,570 | 4/1987 | Gronholz et al. | 55/501 X |
| 4,664,683 | 5/1987 | Degen et al. | 55/524 X |
| 4,665,050 | 5/1987 | Degen et al. | 502/402 |
| 4,684,510 | 8/1987 | Harkins | 55/385.6 X |
| 4,749,392 | 6/1988 | Aoki et al. | 55/513 X |
| 4,830,643 | 5/1989 | Sassa et al. | 96/108 |
| 4,855,276 | 8/1989 | Osborne et al. | 95/136 X |
| 4,863,499 | 9/1989 | Osendorf | 96/134 |
| 4,938,786 | 7/1990 | Tonomoto | 96/134 X |
| 4,992,084 | 2/1991 | Von Blucher et al. | 55/524 X |
| 5,024,682 | 6/1991 | Turk | 423/230 X |
| 5,030,260 | 7/1991 | Beck et al. | 55/385.6 X |
| 5,124,856 | 6/1992 | Brown et al. | 96/135 X |
| 5,183,546 | 2/1993 | Oren et al. | 210/502.1 X |
| 5,209,887 | 5/1993 | Von Blucher et al. | 264/117 |
| 5,234,397 | 8/1993 | Wahle et al. | 493/4 |
| 5,236,595 | 8/1993 | Wang et al. | 210/669 |
| 5,240,479 | 8/1993 | Bachinski | 55/487 X |
| 5,275,154 | 1/1994 | von Blücher et al. | 128/205 |
| 5,332,426 | 7/1994 | Tang et al. | 96/153 |
| 5,336,286 | 8/1994 | Alexander, Jr. et al. | 55/528 |
| 5,338,340 | 8/1994 | Kasmark, Jr. et al. | 96/135 |
| 5,350,443 | 9/1994 | von Blücher et al. | 96/135 |
| 5,376,614 | 12/1994 | Birbara et al. | 423/230 X |
| 5,417,743 | 5/1995 | Dauber et al. | 96/135 X |
| 5,447,695 | 9/1995 | Brown et al. | 96/135 X |
| 5,478,377 | 12/1995 | Scavnicky et al. | 96/154 X |
| 5,538,545 | 7/1996 | Dauber et al. | 96/153 |

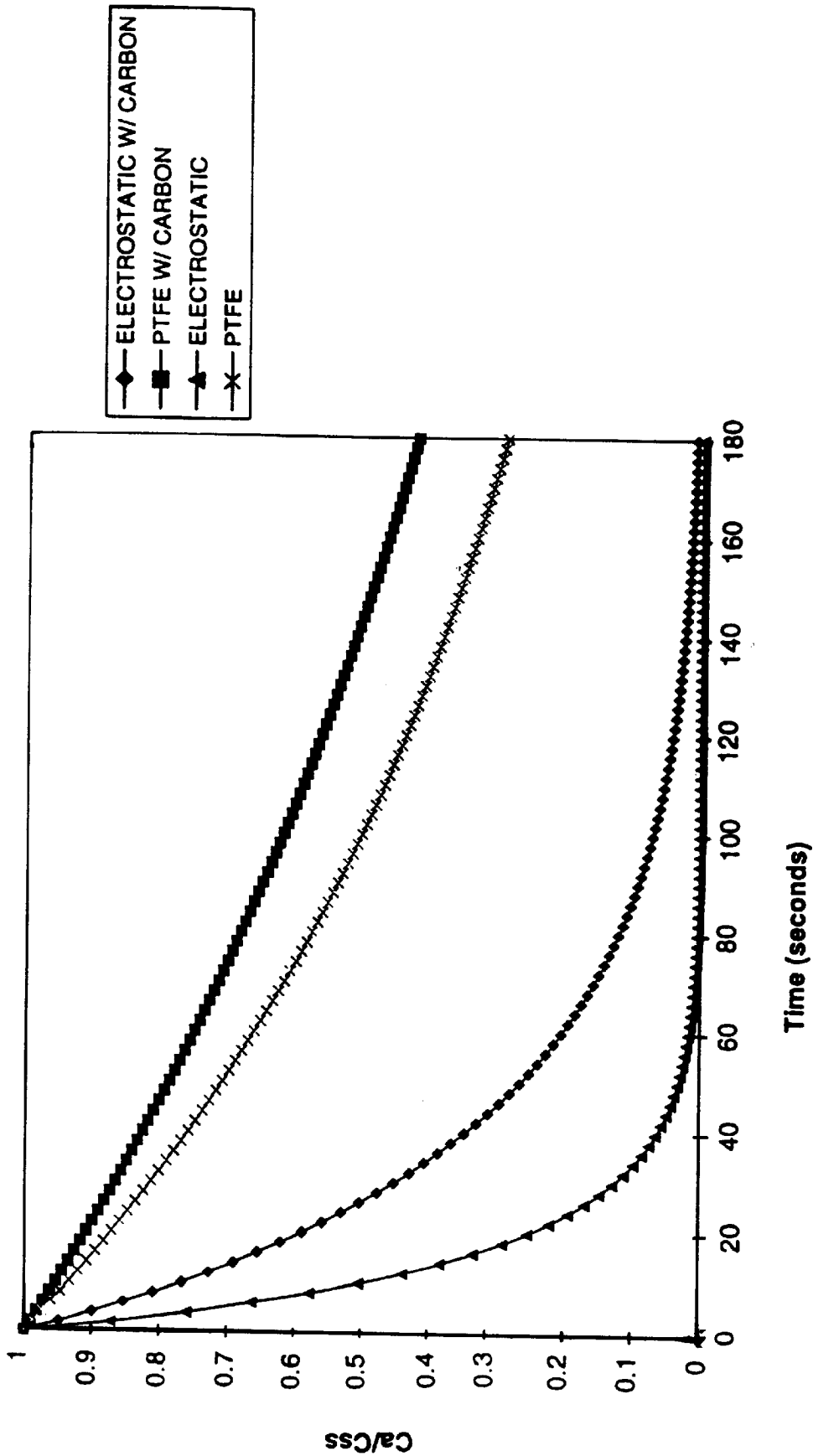

FILTER AND METHOD FOR MAKING A FILTER

This is a Continuation of application Ser. No. 08/492,725, filed Jun. 20, 1995, now abandoned, which application is incorporated herein by reference.

FIELD OT THE INVENTION

The present invention relates to a filter and to a method for making a filter. More particularly, the filter is useful as a recirculation filter in a hard disk drive enclosure.

BACKGROUND OF THE INVENTION

Hard disk drives are enclosures in which an inflexible platter coated with magnetic material is spun very rapidly. A magnetic read/write head "flies" only a few microns above the disk on an air cushion. To provide a hard disk drive having high efficiency, it is desirable to position the head as close to the disk as possible without touching it.

It has been found that particulate and gaseous contaminants act to reduce efficiency and longevity of hard disk drives. Common sources of contaminants in disk drives include leaks which may or may not be intentional, the manufacturing environment which can contain certain contaminants, and the materials incorporated into the disk drive which give off particulates and gases. It is of particular concern that organic vapors can be generated inside disk drive enclosures during normal operating conditions when, for example, the temperature exceeds 150° F. Such temperatures can be achieved by simply leaving the computer in the trunk of a car on a hot day.

Recirculation filters have been used in hard disk drives for removing contaminates. Such filters have been effective for removing particulate contaminants. They are not, however, suitable for removing organic vapors since they do not have a capacity for permanently adsorbing organic vapors. To provide enhanced organic vapor removal, it has been proposed to include activated carbon in recirculation filters. Activated carbon in the form of granules or fiber can adsorb organic vapors. However, permeability of filters including such activated carbon is sacrificed. This results in an overall lower effectiveness of the filter.

Another problem is that activated carbon granules or fibers can escape filtering media and contaminate the hard disk drive enclosure. Previous attempts at controlling carbon migration include coating the edges of filters with resins or epoxies, and using additional material and/or mechanical clamps to seal the filter edges. Although these attempts help control carbon migration, it would be desirable to further reduce carbon migration.

SUMMARY OF THE INVENTION

A filter is provided by the present invention. The filter includes a layer of particulate adsorbing medium and a layer of organic vapor adsorbing medium. Preferably, the filter has a figure of merit greater than about 10 and a capacity for permanently adsorbing organic vapors. The figure of merit is calculated based upon a fractional efficiency determined for particles having a size of 0.3 µm in an air flow having a velocity of 10.5 ft./min and for Frazier permeability at 0.5 inches $H_2O$.

The filter can include an organic vapor adsorbing layer comprising porous adsorbent beads, a first particulate removal layer on one side of the organic vapor adsorbing layer, and a second particulate removal layer on the second side of the organic vapor adsorbing layer. The porous adsorbent beads can be activated carbon beads which allow air to pass therethrough with little resistance and which have pores providing increased surface area for adsorbing organic vapors. The particulate removal layers can be made of electrostatic media and/or polytetrafluoroethylene.

A method for preparing a filter for use in removing particulates and organic vapors from an air stream is provided by the present invention. The method includes the step of providing filter materials which will provide a figure of merit of greater than about 10 and an organic vapor adsorbing capacity. The porous beads can be capable of adsorbing trimethylpentane and hydrogen sulfide.

A method for impregnating porous beads with an impregnant for adsorbing acid gases is provided by the present invention. The process includes the steps of dissolving impregnant in a solvent to provide a solution of impregnant and solvent, immersing porous beads in the solution to allow solution to coat the porous beads, and drying the coated porous beads to evaporate the solvent. Preferably, the solvent is distilled water, and the impregnant is selected from the group consisting of calcium carbonate, potassium carbonate, sodium carbonate, and mixtures thereof.

BRIEF DESCRIPTION OF THE DRAWINGS

FIG. 4 is a graph of disk drive particulate clean-up comparison of recirculation filters from Example 4

DETAILED DESCRIPTION OF THE INVENTION

Figure 1:
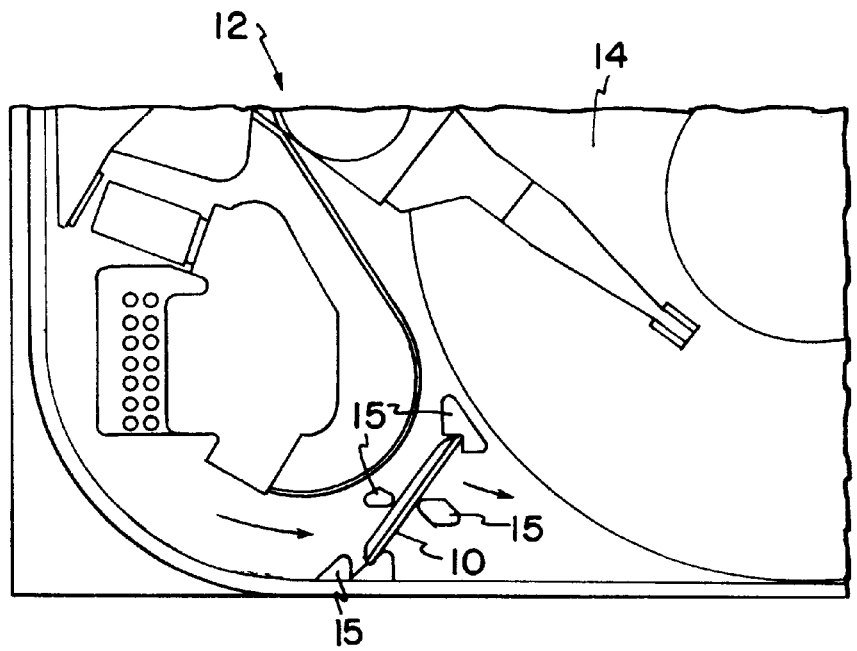
FIG. 1 is a schematic view of a portion of a hard disk drive containing a filter according to the present invention.

The preferred embodiment of the invention is now described in detail with reference to the drawings, wherein like reference numerals represent like parts and assemblies throughout the several views. Reference to the preferred embodiment does not limit the scope of the invention, which is limited only by the scope of the claims attached hereto.

Figure 2:
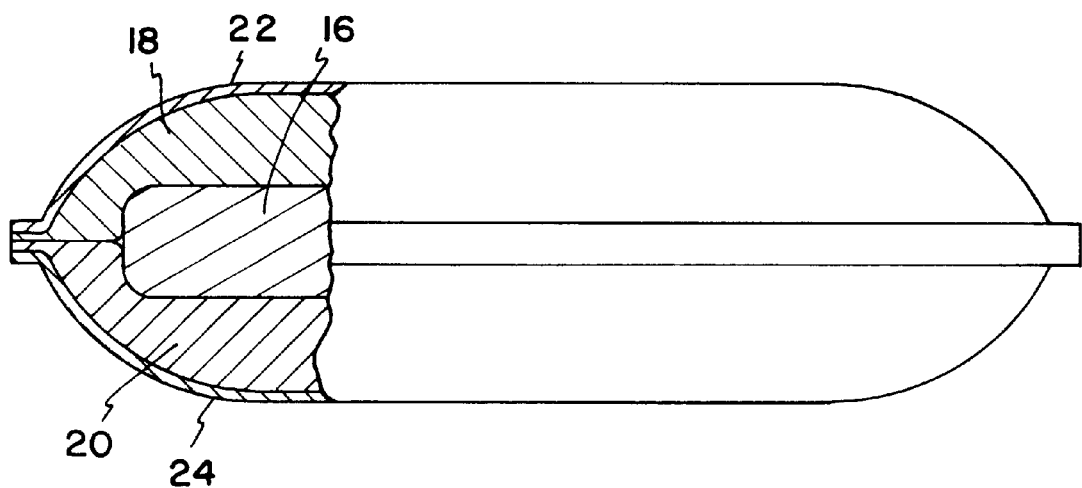
FIG. 2 is a partial cross-sectional view of the filter shown in FIG. 1.

Referring to FIGS. 1 and 2, a filter in accordance with the present invention is depicted at reference numeral 10. The filter 10 is shown in use as a recirculation filter inside the hard disk drive enclosure 12, and is referred to as the "recirculation filter" or more conveniently as the "filter." In the embodiment of the invention shown, the filter is referred to as a type of "pillow filter" which is meant to describe filters having a pillowy shape and which are sealed on the edges to discourage the components of the filter from escaping. As will be apparent from the following description, the filter of the invention can have other structures or shapes, such as, tubular, bag-like, etc.

It is a preferred embodiment of the present invention that the filter can function as a recirculation filter in hard disk drives. The filter is particularly advantageous as a recirculation filter in hard disk drives because it has a low pressure drop across the filter and a high degree of filtering of particulate and gaseous contaminants from the environment inside a disk drive. Of course, the filter of the invention can be used in many other applications where these properties are desired.

As the disk 14 rotates counterclockwise, a stream of air and gases is caused to flow or circulate in the same direction and is represented by the arrows. By strategic placement of the filter 10 across the air stream, one skilled in the art can take advantage of the air flow to provide a filtering effect during operation of the hard disk drive 12 to remove contaminants and thereby provide enhanced air clarification. It should be appreciated that in the context of this invention the reference to the "removal" of contaminants refers to the clarification of the stream being filtered. In a preferred embodiment, it is believed that the stream being clarified in a hard disk drive enclosure is an air stream. It should be appreciated, however, that streams of other gases or liquids could also be clarified by the filter of the present invention. The removal of contaminants from a liquid or gas stream by a filter can also be referred to as entrapment of the contaminants inside the filter.

The filter 10 is held in place in the disk drive enclosure 12 by the supports or frame 15. The frame can be provided around the filter and can be separable from the enclosure. If desired, the filter can be welded to the frame or "fitted" in place.

Now referring to FIG. 2, a partial cross section of the filter 10 is shown. The filter 10 includes an organic vapor removal layer 16 and particulate removal layers 18, 20. The organic vapor removal layer 16 can provide permanent removal of certain organic vapor contaminants, and the particulate removal layers 18, 20 can provide permanent removal of certain particulate contaminants. It should be understood that "permanent removal" refers to the removal or entrapment of contaminants which are not released from the filter during normal operating conditions for a particular application. In the case of the filter 10 which is used inside the hard disk drive enclosure 12, the permanent removal of certain particulate and vaporous contaminants from the environment inside the hard disk drive enclosure 12 reflects the fact that those contaminants are not released into the stream of air during normal operating conditions. During conditions which are not normal, for example, when the temperature of the organic vapor removal layer is heated in excess of normal operating temperatures, it may be able to force organic vapors out of the organic vapor removal layer.

It should be understood that the organic vapor removal layer 16 can, if desired, provide some degree of particulate contaminant removal. The particulate removal layers 18, 20, however, generally do not provide for permanent organic vapor removal. The reason for this is that the materials which make up the particulate removal layers 18, 20 do not physically function to achieve permanent removal of organic vapor contaminants. Although, organic vapors may attach to these layers, they can usually become released during the normal operation of the hard disk drive.

The scrim 22, 24 are provided to keep the components of the filter 10 from escaping into the environment of the hard disk drive enclosure 12. The scrim 22, 24 should have a porosity which is sufficient to minimize pressure drop but, at the same time, contain the components of the filter 10. If, for example, the particulate removal layers are made of a fibrous nonwoven material, the scrim should be sufficient to discourage the fibers from escaping. The scrim could be omitted from the filter if they are not needed to prevent or discourage components of the filter from escaping. It should also be appreciated that a filter according to the present invention can be provided having organic vapor and particulate contaminant removal properties without a scrim.

Development of filtering medium and methods for the manufacture thereof according to the present invention are based, in part, upon a number of observations made during experimentation with other recirculation filters. In particular, it was observed that a problem with many prior art recirculation filters is that they either do not provide sufficient removal of certain contaminants or that they provide insufficient permeability which results in an inability to sufficiently clean the environment. If the permeability of a recirculation filter becomes too low, the filter tends to act like a wall rather than a filter. Since recirculation filters generally function passively by virtue of their placement in a stream of moving air, a low permeability will tend to encourage air to flow around rather than through the filter. As a result, it will take longer to purify the air.

Applicants discovered an important relationship between the ability of a recirculation filter to provide sufficient clarification of a stream and a calculable property called Figure Of Merit (FOM). Accordingly, the FOM of a filter or filter medium is calculated to evaluate the usefulness of the filter or filter medium in a recirculation filter. It should be appreciated that the FOM can be used to evaluate the usefulness of a filter or filter medium for other applications as well, including open or closed recirculation systems, and room air cleaners, automotive cabin air cleaner and the like. For purposes of the description of the present invention, a filter medium can be a whole filter or any part or layer of a filter.

The Figure of Merit, discussed more fully hereinafter, is similar to another property called Figure of Merit Prime (FOM'). FOM' is defined as the fractional efficiency of a medium divided by its resistance. The equation describing the Figure of Merit Prime is:

$$\text{FOM'} = \text{fractional efficiency/resistance} \quad (1)$$

The fractional efficiency is the fraction or percentage of particles of a specified size which are removed from air passing through the medium at a specified air flow velocity. Applicants have found it convenient to determine fractional efficiency based upon a particle size of 0.3 $\mu$m and an air flow velocity of 10.5 ft./min. It should be understood that the particle size of 0.3 $\mu$m actually reflects a distribution of particles of between 0.3 and 0.4 $\mu$m. The resistance is the slope of the pressure drop of the filter as a function of the air flow velocity. For convenience, the units chosen are inches of water for pressure drop and feet per minute for air flow velocity. The units for resistance are then inches $H_2O$/ft./min.

Since the resistance for a given filter medium can be difficult to obtain, the Frazier permeability is used as a convenient substitute. The Frazier permeability is the linear air flow velocity through a medium at a half inch of water pressure (0.5 "$H_2O$). The Figure of Merit (FOM) is:

$$\text{FOM} = \text{fractional efficiency} \times 2 \times \text{Frazier permeability} \quad (2)$$

The Frazier permeability is calculated from measurements of pressure drop ($\Delta P$) in units of inches of water ("$H_2O$) at a specified air flow velocity or volumetric flow rate. The Frazier permeability is estimated by multiplying 0.5 times the air flow velocity and dividing by the pressure drop. It should be appreciated that the volumetric flow rate can be converted to an air flow velocity by dividing by the area of the medium, and that the air flow velocity should be converted to feet per minute (ft./min.).

For recirculation filters, it is desirable to provide a FOM which is as high as possible. A high FOM corresponds with high permeability which is important for a filter placed in a stream of circulating air. Preferably, the filter has a FOM value of at least about 10, more preferably at least about 60, and even more preferably at least about 150. Generally, the FOM should be between about 50 and about 250, and more preferably between about 150 and about 200.

An important feature of the invention is to use the FOM property to manufacture a filter for a specific application. To calculate the FOM for a filter having several layers and which has not been assembled, the fractional efficiency can be calculated as the total penetration of the individual layers. The total Frazier permeability is the reciprocal of the sum of the reciprocals of the Frazier permeabilities of each layer. The total FOM is then the total penetration multiplied by the total Frazier permeability multiplied by 2.

The capacity of a filtering medium refers to the ability of the medium to permanently adsorb organic vapors. The capacity of a filtering medium can be expressed in regard to its ability to permanently adsorb a particular organic chemical contaminant, such as 2,2,4-trimethylpentane (TMP), or any other organic vapor which acts as a contaminant in a particular environment. In hard disk drives, organic vapors are of particular concern since they can be generated under normal operating conditions from adhesives, plastics, etc. used in preparing the disk drive.

The organic vapor removal layer 16 is preferably a layer of porous adsorbent beads which are capable of adsorbing organic vapors. It is an advantage of the present invention that the beads have a size which allows them to be arranged in a way which allows air or other gas or liquid to flow therethrough with little resistance. The beads can be arranged orderly on a substrate such as a woven or non-woven material, or placed together in a more random arrangement. In addition, the pores increase the surface area to provide for more contact with gas or liquid. In fact, the porous adsorbent beads can provide greater surface area per unit weight than granular activated carbon, while providing less resistance to the flow of air.

A preferred layer of porous adsorbent beads is provided as activated carbon beads affixed to a polyester woven substrate. The porous adsorbent beads preferably have an average diameter of 0.6 mm, a pore size of less than 20 angstrom, a basis weight of 415 mgs/in.$^2$; and a Frazier Permeability of 300 ft./min. Porous adsorbent beads which are used in the organic vapor removal layer of the present invention can be manufactured according to the teachings of U.S. Pat. No. 5,209,887, which is incorporated herein by reference. In particular, the beads should have a size which is sufficient to provide a desired FOM and capacity for removal of organic vapors. The beads should be large enough to minimize leakage of the beads into the stream being purified, and should be small enough to provide a filter having desired thickness requirements and organic vapor adsorption capacity. An exemplary size of beads can be in the range of 0.3–1 mm. The average pore size of the porous beads should be sufficient to provide desired adsorption of specific organic vapors which are to be removed. A preferred range of pore sizes can be less than about 20 angstrom. It has been found that beads formed from 415 mgs of carbon can provide a capacity of 73.0 mgs H$_2$S/inch$^2$.

It is understood that any other material which can provide sufficient permanent adsorption of organic vapors and a desired Figure of Merit can also be used as the organic vapor removal layer. It is believed that exemplary materials which can provide porous beads for permanent organic vapor adsorption include silica, molecular sieve materials, ion exchange materials, diatomacious earth and the like. Desiccant material can additionally be included into the filter if it is desired to remove water. Exemplary desiccant materials include silica and molecular sieve materials.

In a preferred embodiment of the invention, the organic vapor removal layer 16 is impregnated with a chemical which provides enhanced acid gas removal. Exemplary chemicals which can be used to evaluate an impregnants ability to remove acid gas include hydrogen sulfide (H$_2$S), hydrochloric acid (HCl), chlorine gas (Cl$_2$), and the like. It is understood that acid gases can be generated inside a hard disk drive.

Impregnated carbon beads are prepared by dissolving impregnant in a solvent. The solvent can be selected based upon its ability to adsorb impregnant and evaporate without providing a significant residue. A preferred solvent for use in the present invention is distilled water. Once the impregnant is dissolved, the porous beads are immersed therein until a specific level of adsorption of impregnant occurs. Generally, the immersion time can be about 3 minutes for the above identified beads. Once the beads are impregnated to a desired extent, they are removed and dried in an oven. For the above beads, this can correspond with a temperature of about 180° C. for 10 to 20 minutes.

It is generally desired for the porous beads to have sufficient impregnant to provide desired removal of acid gas. For the above identified beads, this usually corresponds to an impregnant content of about 3% by weight. The upper limit of impregnant content can be related to the saturation point of the impregnant in the solvent, and the lower limit can be determined in order to provide a specific amount of acid gas removal. Generally, a range of impregnant can be 1 to 20% by weight, and more preferably 2 to 5% by weight. Exemplary impregnants which can be used in the present invention include potassium carbonate, sodium carbonate, calcium carbonate and the like.

The particulate removal layers can be made of any material commonly available for particular filtration, and can have any thickness which provides desired FOM and particulate removal. Preferably, the thickness of each layer should be between about 0.1 to 5 mm, more preferably between about 0.15 to 1.0 mm, and more preferably between about 0.20 to 0.25 mm. Preferably, the particulate removal layers are made of an electrostatic medium, or a polymer medium such as Teflon. A preferred electrostatic medium is a mixed fiber medium of 50% polypropylene and 50% modacrylic that exhibits a permanent electrical potential, having a Fomblin Efficiency of 76–94% average with no single value below 71 or above 99 (test at 10.5 ft./min. airflow, 0.3–0.4 micron particles); permeability of 283–476 ft./min.; thickness of 0.036–0.061 inches; and basis weight of 48–75 lbs./3000 ft$^2$. An exemplary polymer medium is a Teflon fibrous membrane filter medium having a Fomblin Efficiency of 98.0% minimum (challenge solution is 50% Fomblin in Freon); a Frazier Permeability of 15.0 ft./min. minimum average (all readings greater than 11.0 ft./min.); and a tensile strength of less than 7000 psi average over 5 samples.

The following examples are illustrative of the presently contemplated preferred embodiments for practicing the invention and should not be considered as limiting thereof.

EXAMPLE 1

Preparation of Recirculation Filter

The filter 10 of the present invention can be prepared by combining the layers 16, 18, 20, 22 and 24 and sealing the edges using a sonic welder such as a Branson 900 or 800. The organic vapor removal layer can be cut using a steel rule die.

U.S. patent application Ser. No. 08/017,812, entitled "Preventing Carbon Migration From Filter Media," filed with the U.S. Patent and Trademark Office on Feb. 16, 1993 and now abandoned, describes a method for welding the edges of a filter, which can be adapted for preparing filters according to the present invention. The teachings of this patent application are incorporated herein by reference.

EXAMPLE 2

Impregnating Porous Carbon Beads

A solution of 30% (weight/weight) of $K_2CO_3$ is prepared by slowly stirring 3000 grams of $K_2CO_3$ into 10 liters of distilled water. The solution is complete when the liquid is clear.

Porous adsorbent beads made from activated carbon and having an average diameter of 0.6 mm, a pore size of less than 20 angstrom, a basis weight of 415 mgs/in.$^2$; and a Frazier Permeability of 300 ft./min., and being attached to a woven polyester substrate, is immersed in the solution for 1 to 3 minutes, until the pores of the beads are saturated. The saturated beads are then dried in an oven at a temperature of about 180° C. for 10 to 20 minutes. The resulting beads contain about 3% weight of $K_2CO_3$.

EXAMPLE 3

The Static Gas Test

The Procedure

Recirculation filters are provided in individual plastic envelopes. The envelopes are labeled with the filter type. The filters themselves are not labeled. The filters are handled with forceps only.

The filters are weighed to the nearest 0.1 mg on a recently calibrated scale and the weights are recorded as "As Arrived Weight." This provides an additional base line value that is easy to obtain and can be used to evaluate changes due to adsorption of moisture from the air. The relative humidity in the lab at the time of weighing is recorded. After each filter is weighted, it is placed in a small, wide mouth glass jar (3.3 cm diameter×4.0 cm in height) and an identification name and/or number is written on the jar. The filters are transferred to the jars so that they are more exposed to the atmosphere for both subsequent drying and re-equilibration to ambient humidity conditions. When the filters are not in use or actively being dried or equilibrated with the atmosphere (with the lid of the jar off) they will be kept in the jars with a cover placed on loosely to protect from any airborne particulate contamination.

All of the jars are placed in a vacuum desiccator which contains anhydrous activated silica gel in the bottom. Blue, indicating silica gel is to be used and it should be completely blue (a sign that it is dry) and not red (a sign that it is wet). The air is removed from the desiccator with a vacuum pump, and the samples are allowed to dry for at least 12 hours.

Each filter is weighed to the nearest 0.1 mg and the weight is recorded as the "Pre-Test Dry Weight." This weighing should be done as quickly as possible to minimize the exposure time of the filters to the air outside the desiccator prior to weighing.

The filters, in the open wide jars are left exposed to the atmosphere for a minimum of eight hours so that they can re-equilibrate with the moisture in the atmosphere. The reason for doing this is that during the actual testing the filters will be exposed to the atmosphere and, therefore, be in equilibrium with the moisture in the atmosphere. For the weight retention data to be meaningful, and not be partially just a measure of the amount of moisture adsorbed during the experiment, the filters should be either completely dry at both the beginning and end of the experiment or in equilibrium with the ambient atmosphere both times. In this experiment, weights are reported for both conditions for each filter.

The Test

The test is performed by placing each of the filters to be tested in a separate, open wide-mouthed jar. The jars are placed in a large, clean vacuum desiccator that does not contain drying agent, and the jars are covered with large watch glass. All of the ground glass joints should be greased with high quality silicone grease. Air from the vacuum desiccator is removed with a vacuum pump. The test gas is connected to the vacuum desiccator using Teflon tubing. The vacuum desiccator is filled with the test gas until there is no more vacuum. The filters stand in the saturated atmosphere of the test gas for 2 hours. The lid on the desiccator is then removed and the test gas is vented out of the hood. As soon as it is safely possible, the filters are weighed and recorded as "weight after 2 hours." The test is repeated until the weight remains constant for two consecutive measurements, or three 2-hour exposures have been completed.

All of the samples from all of the gas experiments are placed in a vacuum desiccator with a vacuum pump and dried for at least 12 hours according to the procedure described above. Some of the filters will have been sitting around longer than others, but there is no practical way to get this "Post-Test Dry Weight" except by drying all of the samples at the same time. All of the dried filters are weighed and the weights are recorded as "Post-Test Dry Weight."

EXAMPLE 4

Chemical Clean-Up Time Tests

A disk drive enclosure is provided with an air flow of 125 ml/min. Values are set to bypass the 2,2,4-trimethylpentane (TMP) and flow through the disk. The pressure in the disk drive is measured and should be consistent. The Gas Chromatograph/Flame Ionization Detector (GC/FID) signal is monitored and baseline values are noted. Air is caused to flow through a 25° C. heat exchanger holding a diffusion vial (containing TMP), bypasses the drive and is detected by the FID. The system is allowed to come to equilibrium at 50 ppm TMP. The GC/FID data acquisition is started. After the feed of 50 ppm TMP concentration is recorded, the flow is redirected through the disk drive which should not be on. After three minutes, the concentration through the drive is allowed to stabilize at 12 ppm TMP. The air without TMP is redirected through the drive. The test continues until the signal from the FID reaches the baseline signal.

Four filters were tested. A first filter was "electrostatic with carbon"; a second filter was "PTFE with carbon"; a third filter was "electrostatic"; and a fourth filter was "PTFE"; and a fifth was "electrostatic with impregnated carbon."

The above reference to "carbon" refers to porous adsorbent beads having an average diameter of 0.6 mm, a pore size of 20–40 angstrom, a basis weight of 415 mgs/in.$^2$; and a Frazier Permeability of 300 ft./min. The reference to "impregnated carbon" refers to the above "carbon" containing 3% by weight $K_2CO_3$. The reference to "electrostatic" refers to a mixed fiber medium of 50% polypropylene and 50% modacrylic that exhibits a permanent electrical potential, has a Fomblin Efficiency of 76–94% average with no single value below 71 or above 99 (test at 10.5 ft./min. airflow, 0.3–0.4 micron particles); permeability of 283–476 ft./min.; thickness of 0.036–0.061 inches; and basis weight of 48–75 lbs./3000 ft$^2$. The "PTFE" refers to a Teflon fibrous membrane filter medium having a Fomblin Efficiency of 98.0% minimum (challenge solution is 50% Fomblin in Freon); a Frazier Permeability of 15.0 ft./min. minimum average (all readings greater that 11.0 ft./min.); and a tensile strength of less than 7000 psi average over 5 samples.

Figure 3:
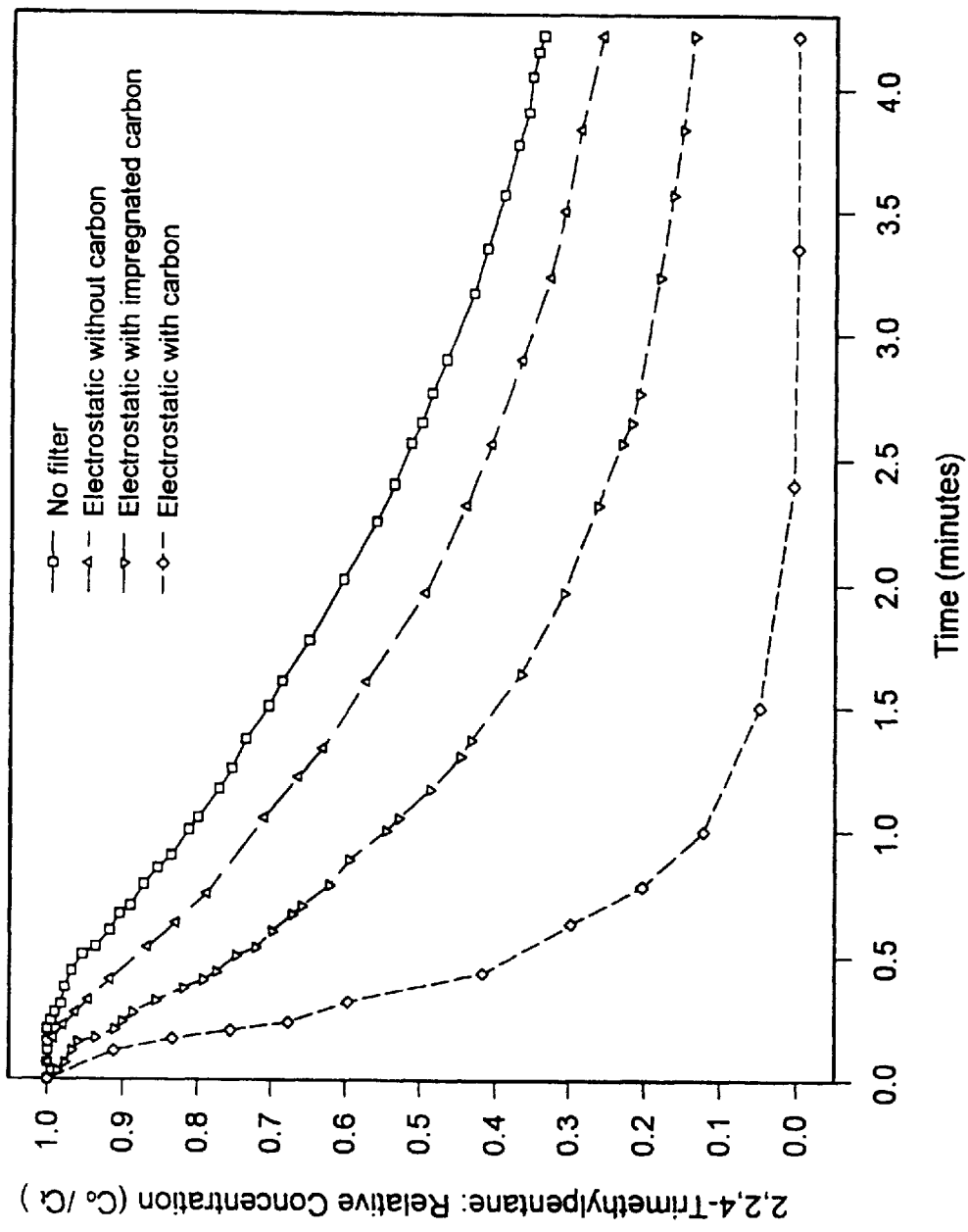
FIG. 3 is a graph of disk drive chemical clean-up comparison of recirculation filters from Example 4.

The results of the test for four samples are provided in FIG. 3.

A similar test was carried out for particulates, and the results are provided in FIG. 4.

What is claimed:

1. A filter comprising:
   (a) layer of particulate removal medium having a thickness of between about 0.1 and about 5.0 mm.;
   (b) layer of organic vapor adsorbing medium comprising porous activated carbon beads affixed to a substrate, wherein the porous activated carbon beads have an average diameter of between about 0.3 and about 1 mm., and said porous activated carbon beads being impregnated with between about 2 and about 5% by weight chemical for adsorbing acid gas; and
   (c) scrim layers covering said layer of particulate removal medium and layer of organic vapor adsorbing medium, and wherein said filter has sealed edges,
   wherein said filter has a figure of merit greater than about 10 wherein the figure of merit is calculated based upon a fractional efficiency determined for particles having a size of 0.3 µm in an air flow having a velocity of 10.5 ft./min. and for Frazier permeability at 0.5 inches $H_2O$.

2. A filter according to claim 1, wherein the thickness of the layer of particulate removal medium is between about 0.15 and about 1.0 mm.

3. A filter according to claim 1, wherein the thickness of the layer of particulate removal medium is between about 0.20 and about 0.25 mm.

4. A filter according to claim 1, wherein the particulate removal medium comprises an electrostatic medium.

5. A filter according to claim 4, wherein the electrostatic medium comprises a mixed fiber medium comprising polypropylene and acrylic.

6. A filter according to claim 1, wherein the particulate removal layer comprises polytetrafluoroethylene.

7. A filter according to claim 1, wherein the porous activated carbon beads comprise pores having an average size of less than 20 angstrom.

8. A filter according to claim 1, wherein the chemical is selected from the group consisting of sodium carbonate, calcium carbonate, and potassium carbonate.

9. A filter according to claim 1, wherein the filter is a recirculation filter for use in a disk drive.

10. A filter according to claim 1, wherein said figure of merit of said filter is greater than about 60.

11. A filter according to claim 1, wherein said figure of merit of said filter is between about 150 and about 200.

12. A method for preparing a filter for use in removing particulates and organic vapors from an air stream provided inside of a disk drive, said method including steps of:
   (a) providing a filter comprising:
      (i) layer of particulate removal medium having a thickness of between about 0.1 and about 5.0 mm.;
      (ii) layer of organic vapor adsorbing medium comprising porous activated carbon beads affixed to a substrate, wherein the porous activated carbon beads have an average diameter of between about 0.3 and about 1 mm., and said porous activated carbon beads being impregnated with between about 2 and about 5% by weight chemical for adsorbing acid gas; and
      (iii) scrim layers covering said layer of particulate removal medium and layer of organic vapor adsorbing medium, and wherein said filter has sealed edges,
   (b) placing said filter inside a disk drive.

13. A method for preparing a filter according to claim 12, wherein the thickness of the layer of particulate removal medium is between about 0.15 and about 1.0 mm.

14. A method for preparing a filter according to claim 12, wherein the thickness of the layer of particulate removal medium is between about 0.20 and about 0.25 mm.

15. A method for preparing a filter according to claim 12, wherein the particulate removal medium comprises an electrostatic medium.

16. A method for preparing a filter according to claim 15, wherein the electrostatic medium comprises a mixed fiber medium comprising polypropylene and acrylic.

17. A method for preparing a filter according to claim 12, wherein the particulate removal layer comprises polytetrafluoroethylene.

18. A method for preparing a filter according to claim 12, wherein the porous activated carbon beads comprise pores having an average size of less than 20 angstrom.

19. A method for preparing a filter according to claim 12, wherein the chemical is selected from the group consisting of sodium carbonate, calcium carbonate and potassium carbonate.

20. A method for preparing a filter according to claim 12, wherein the filter has a figure of merit greater than about 60.

21. A method for preparing a filter according to claim 12, wherein said filter has a figure of merit between about 150 and about 200.

* * * * *

UNITED STATES PATENT AND TRADEMARK OFFICE
CERTIFICATE OF CORRECTION

PATENT NO. : 5,997,618
DATED : DECEMBER 7, 1999
INVENTOR(S) : SCHNEIDER ET AL.

It is certified that error appears in the above-identified patent and that said Letters Patent is hereby corrected as shown below:

Front Page, [56] References Cited, U.S. Patent Documents:

In Patent No. 4,397,907, please change "ROSSNER ET AL" to --ROSSER ET AL--

Signed and Sealed this

Twenty-second Day of May, 2001

*Attest:*

NICHOLAS P. GODICI

*Attesting Officer*     *Acting Director of the United States Patent and Trademark Office*